US009002573B2

(12) United States Patent
Kawamura et al.

(10) Patent No.: US 9,002,573 B2

(45) Date of Patent: Apr. 7, 2015

(54) ELECTRONIC CONTROL UNIT AND INFORMATION MANAGEMENT SYSTEM

(75) Inventors: Yoshikuni Kawamura, Obu (JP); Kokichi Shimizu, Kariya (JP); Kazunori Okada, Chiryu (JP); Masayoshi Kondo, Chiryu (JP)

(73) Assignee: Denso Corporation, Kariya (JP)

( * ) Notice: Subject to any disclaimer, the term of this patent is extended or adjusted under 35 U.S.C. 154(b) by 754 days.

(21) Appl. No.: 13/158,779

(22) Filed: Jun. 13, 2011

(65) Prior Publication Data

US 2011/0304448 A1 Dec. 15, 2011

(30) Foreign Application Priority Data

Jun. 11, 2010 (JP) ................................ 2010-134247

(51) Int. Cl.
*G01M 17/00* (2006.01)
*G07C 5/08* (2006.01)

(52) U.S. Cl.
CPC .............. *G07C 5/0808* (2013.01); *G07C 5/085* (2013.01); *G07C 2205/02* (2013.01)

(58) Field of Classification Search
USPC .............................. 701/33.4, 29.2, 35, 29, 36
See application file for complete search history.

(56) References Cited

U.S. PATENT DOCUMENTS

| | | | | |
|---|---|---|---|---|
| 5,964,813 A * | 10/1999 | Ishii et al. | .................... | 701/29.2 |
| 2009/0271063 A1 | 10/2009 | Yasue et al. | | |
| 2009/0287370 A1 | 11/2009 | Iwai et al. | | |

OTHER PUBLICATIONS

Japanese Official Action dated Oct. 23, 2012 issued in corresponding Japanese Application No. 2010-134247, with English translation.

* cited by examiner

*Primary Examiner* — Shirley Lu
(74) *Attorney, Agent, or Firm* — Nixon & Vanderhye PC

(57) ABSTRACT

A VIN storage electronic control unit stores a vehicle identification number (VIN). A standby RAM that holds data constantly with an electric power supplied by a battery stores failure diagnosis related information and a rewriting history flag. When the VIN storage electronic control unit rewrites the VIN upon receiving a request signal for rewriting the VIN, the standby RAM updates the rewriting history flag so as to switch into a set status indicating the rewriting is made. When receiving a request signal for eliminating the failure diagnosis related information, the failure diagnosis related information stored in the standby RAM is reset and the rewriting history flag is switched into a reset status. In addition, while the rewriting history flag is in the set status, a malfunction indicator lamp is turned on.

11 Claims, 9 Drawing Sheets

ELECTRONIC CONTROL UNIT AND INFORMATION MANAGEMENT SYSTEM

CROSS REFERENCE TO RELATED APPLICATION

The present application is based on and incorporates herein by reference Japanese Patent Application No. 2010-134247 filed on Jun. 11, 2010.

FIELD OF THE INVENTION

The present invention relates to an electronic control unit that is enabled to rewrite a vehicle identification code and an information management system equipped with the electronic control unit.

BACKGROUND OF THE INVENTION

[Patent document 1] JP 2009-274514 A (US 2009/0287370 A1)

There is known a technology to store a vehicle identification code in a specific one of several in-vehicle electronic control units mounted in a vehicle and enables an identification of the vehicle by referring to the vehicle identification code stored in the specific electronic control unit. Such an identification code or number is practically used in the U.S.A. as VIN (Vehicle Identification Number) that is given to each vehicle.

One example of a vehicle provided with the above technology is as follows. In a vehicle inspection, a dedicated scanning tool is connected to an in-vehicle network of the vehicle; the vehicle identification number is acquired from the electronic control unit via the in-vehicle network, thereby enabling the identification of the vehicle that is inspected. In such a vehicle inspection, for instance, failure diagnosis related information is acquired from an in-vehicle electronic control unit so as to check for an anomaly. Here, the stored failure diagnosis related information indicates an execution or a non-execution and an execution result of a failure diagnosis.

In addition, the above electronic control unit storing a VIN (referred to as a VIN storage ECU) is known which is enabled to rewrite the VIN stored therein. The VIN that is stored in the VIN storage ECU is assigned uniquely to each vehicle. When the VIN storage ECU is replaced due to a defect, there is a need to write the same unique VIN in a new electronic control unit to serve as a VIN storage ECU. For such a need, the rewriting function of the VIN is thus used.

However, when the rewriting function is provided to the VIN storage ECU, it might be abused. For example, suppose a case where (i) a VIN storage ECU of a vehicle B having no anomaly is mounted in a vehicle A having an anomaly, and (ii) the VIN of the VIN storage ECU is rewritten to the VIN unique to the vehicle A. Here, the failure diagnosis related information stored in the VIN storage ECU, that is belonging to the vehicle B having no anomaly can be pretended to be pertinent to the vehicle A, This may be used as a tool for letting the vehicle A pass the inspection (e.g., emission test) unjustly.

Therefore, according to the regulation (CARB OBD2) in the U.S.A., the rewriting of a VIN is required to be accompanied by simultaneously eliminating the emission-related failure diagnosis information. In response to such a requirement, there is considered a system to eliminate the failure diagnosis prior to the rewriting of a VIN (refer to Patent document 1).

In this regard, the above technology to eliminate the failure diagnosis related information prior to the rewriting of the VIN tends to need a complicated procedure.

SUMMARY OF THE INVENTION

The present invention is made in view of the problem above. It is an object of the present invention to provide a technology to suppress an unjust passage of a vehicle inspection even without adopting a technique of eliminating failure diagnosis related information prior to rewriting of a vehicle identification code or number.

To achieve the object, according to a first example of the present invention, an electronic control unit for a vehicle is provided as follows. The electronic control unit contains a storage media that stores a vehicle identification code and failure diagnosis related information as well, the failure diagnosis related information indicating (i) an execution or a non-execution of a failure diagnosis, and (ii) an execution result of the failure diagnosis. The electronic control unit includes: a rewriting section configured to rewrite the vehicle identification code when a rewriting instruction for the vehicle identification code is inputted; a history writing section configured to write, in the storage media, history information when the rewriting section rewrites the vehicle identification code, the history information indicating an execution of the rewriting of the vehicle identification code; and an elimination section configured to eliminate the history information written by the history writing section when a prescribed condition is satisfied. Here, the elimination section eliminates the failure diagnosis related information together with the history information.

According to the first example, confirming either a presence or an absence of the history information enables a determination as to whether the failure diagnosis related information stored in the electronic control unit is obtained after or before the rewriting of the vehicle identification code. That is, when the history information is stored in the electronic control unit, it is determined that the failure diagnosis related information is obtained before rewriting of the vehicle identification code. When the history information is eliminated from the electronic control unit, it is determined that the failure diagnosis related information is obtained after rewriting of the vehicle identification code.

Therefore, under the above configuration, even if not using a technique of eliminating the failure diagnosis related information prior to the rewriting of the vehicle identification code, an operator of a vehicle inspection confirms the rewriting history, thereby helping prevent unjust passage of the vehicle inspection from occurring.

According to a second example of the present invention, an electronic control unit for a vehicle is provided as follows. The electronic control unit contains as storage media (i) a nonvolatile memory in which data rewriting is electrically enabled, and (ii) a volatile memory serving as a backup memory in which data storage is enabled with an electric power always supplied from a battery, the nonvolatile memory storing a vehicle identification code, the backup memory storing failure diagnosis related information that indicates an execution or a non-execution of a failure diagnosis and an execution result of the failure diagnosis. The electronic control unit includes: a rewriting section configured to rewrite the vehicle identification code when a rewriting instruction for the vehicle identification code is inputted; and a history writing section configured to write, in the backup memory, history information when the rewriting section rewrites, the history information indicating an execution of the rewriting of the vehicle identification code.

According to the configuration of the above electronic control unit, the interruption of the electric power supply to the backup memory results in elimination of not only the history information stored in the backup memory but also the failure diagnosis related information simultaneously. In contrast, when the failure diagnosis related information is kept stored without the battery removed, the history information remains in the backup memory together with the failure diagnosis related information.

According to the second example, similarly, the confirmation of either a presence or an absence of the history information at a vehicle inspection enables a determination whether the failure diagnosis related information stored in the electronic control unit is obtained after or before the rewriting of the vehicle identification code. Without adopting a technique of eliminating the failure diagnosis related information prior to rewriting of a vehicle identification code, an unjust passage of a vehicle inspection can be suppressed.

In particular, according to the second example, the failure diagnosis related information is stored in the backup memory; it is difficult to substitute the electronic control unit with the failure diagnosis related information kept stored. Therefore, this configuration can much more certainly help prevent an unjust passage of a vehicle inspection from occurring.

According to a third example of the present invention, an electronic control unit for a vehicle is provided as follows. The electronic control unit contains a storage media that stores a vehicle identification code and failure diagnosis related information as well, the failure diagnosis related information indicating (i) an execution or a non-execution of a predetermined failure diagnosis, and (ii) an execution result of the predetermined failure diagnosis. The electronic control unit includes: a rewriting section configured to rewrite the vehicle identification code when a rewriting instruction for the vehicle identification code is inputted; a history writing section configured to write, in the storage media, history information when the rewriting section rewrites the vehicle identification code, the history information indicating an execution of the rewriting of the vehicle identification code; a determination section configured to determine whether the predetermined failure diagnosis corresponding to the failure diagnosis related information stored in the storage media is thoroughly executed after the rewriting section rewrites the vehicle identification code; and an elimination section configured to eliminate the history information written by the history writing section when the determination section determines that the predetermined failure diagnosis is thoroughly executed.

According to the third example, after the rewriting of the vehicle identification code, a failure diagnosis is fully executed; then, the failure diagnosis related information is updated to switched into the contents based on the failure diagnosis executed after the rewriting of the VIN. Here, the history information is kept stored until a condition that the failure diagnosis related information is updated is satisfied.

According to the third example, similarly, confirming either a presence or an absence of the history information enables a determination whether the failure diagnosis related information stored in the electronic control unit is obtained after or before the rewriting of the vehicle identification code. Without adopting a technique of eliminating the failure diagnosis related information prior to rewriting of a vehicle identification code, an unjust passage of a vehicle inspection can be suppressed. In addition, this configuration does not need of an operation to eliminate the failure diagnosis related information before and/or after rewriting of the vehicle identification code. Thus, it is convenient for a user.

Under the above mentioned configuration, the electronic control unit storing a vehicle identification code also stores history information which illustrates an execution of rewriting the vehicle identification code. Otherwise, another electronic control unit mounted in the same subject vehicle and connected to an in-vehicle network may store the history information. In such a technique, a scanning tool may be used to collect information stored in each electronic control unit within the in-vehicle network. Based on the presence or absence of the history information, whether the failure diagnosis related information stored in the electronic control unit storing the vehicle identification code is old or new can be specified.

In specific, using a technique to store the history information in another electronic control unit different from an electronic control unit storing a vehicle identification code, to specify whether the failure diagnosis related information stored in the electronic control unit storing the vehicle identification code is old or new based on a presence or an absence of the history information, an information management system for a vehicle according to a fourth example of the present invention is provided as follows.

The information management system includes: at least two electronic control units including a first electronic control unit and at least one second electronic control unit, the at least two electronic control units being communicated via an in-vehicle network within the vehicle, the first electronic control unit storing a vehicle identification code, at least the first electronic control unit out of the at least two electronic control units storing failure diagnosis related information indicating an execution or a non-execution of a failure diagnosis and an execution result of the failure diagnosis. The first electronic control unit includes: a rewriting section configured to rewrite the vehicle identification code when a rewriting instruction for the vehicle identification code is inputted; a history writing section configured to write, in a storage media of one of the at least one second control unit, history information when the rewriting section rewrites, the history information indicating an execution of the rewriting of the vehicle identification code; and an elimination section configured to eliminate the failure diagnosis related information from a storage media contained in the first electronic control unit when an elimination instruction is inputted from a device outside of the vehicle via the in-vehicle network. Here, the one of the at least one second control unit that stores the history information eliminates the history information from the storage media contained in the one of the at least one second electronic control unit when the elimination instruction is inputted via the in-vehicle network.

According to this information management system, based on a presence or an absence of the history information which another electronic control unit holds, it can be specified whether the failure diagnosis related information in the electronic control unit that stores the vehicle identification code is old or new. It is noted that the electronic control unit storing the history information may use the communications with the electronic control unit storing the vehicle identification code, to eliminate the history information stored in the own storage media simultaneously when the electronic control unit storing the vehicle identification code eliminates the failure diagnosis related information in the own storage media. In addition, the electronic control unit storing the history information may eliminate the history information upon receiving via the in-vehicle network an elimination instruction serving as a trigger signal that is also received by the electronic control unit storing the vehicle identification unit.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereafter, description will be given to examples of an embodiment of the present invention with reference to the drawings. However, the present invention is not limited to the examples of the embodiment described below, and can be modified in the various manners.

First Example

Figure 1:
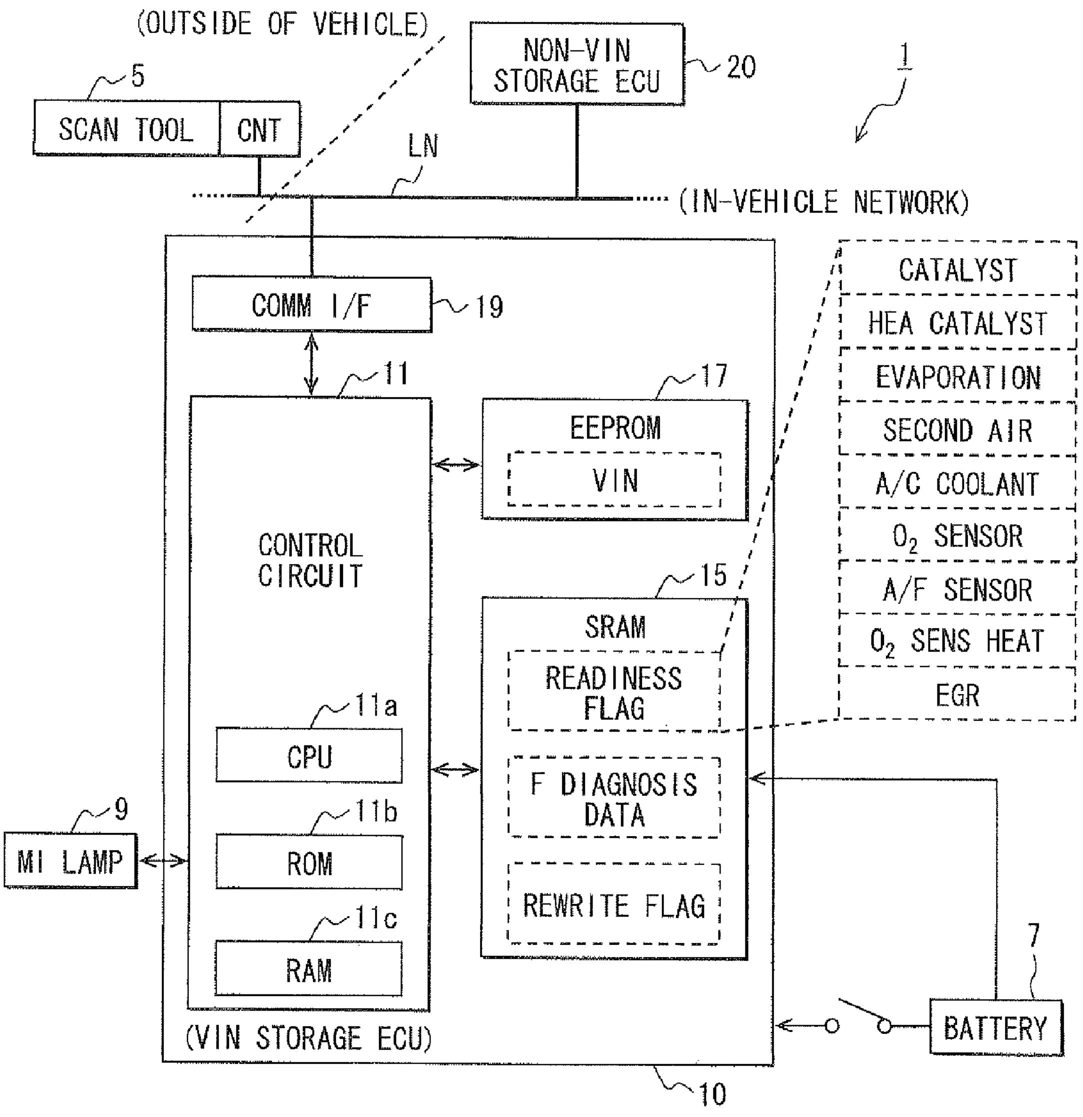
FIG. 1 is a block diagram illustrating a configuration of a communications system according to a first example of an embodiment of the present invention.

With reference to FIG. 1, a communications system 1 of a first example is mounted in a subject vehicle and includes several electronic control units (ECUs) 10, 20, which are data communicated with each other via a communications line LN. The communications line LN has a connector CNT via which a scanning tool 5 is connected from an outside of the vehicle. The electronic control units 10, 20 included in the communications system 1 provide information related with failure diagnosis or the like to the scanning tool 5 according to an instruction inputted via the communications line LN from the scanning tool 5. The scanning tool 5 reads out varieties of information such as failure diagnosis related information from the electronic control units 10, 20 mounted in the vehicle, informing an operator of the scanning tool 5 of a state of the vehicle.

In detail, the present communications system 1 includes a single electronic control unit 10 that stores a VIN (Vehicle Identification Number) serving as an identification code unique to the subject vehicle. Hereinafter, such an electronic control unit 10 that stores the VIN is also referred to as a VIN storage ECU 10, whereas an electronic control unit 20 that does not store any VIN is also referred to as a non-VIN storage ECU 20.

The VIN storage ECU 10 includes a control circuit 11, a standby RAM 15, an EEPROM 17, and a communications interface 19. The control circuit 11 contains a CPU 11*a*, ROM 11*b*, and RAM 11*c*, and realizes the various functions by causing the CPU 11*a* to execute programs stored in the ROM 11*b*. The RAM 11*c* is used as a workspace when the above program is executed by the CPU 11*a*.

The standby RAM 15 is a volatile memory which runs on electric power supplied constantly from a battery 7 mounted in the vehicle irrespective of the ON or OFF state of an ignition switch. That is, the standby RAM 15 can always continue to keep the written data stored while the electric power is supplied from the battery 7. The standby RAM 15 is used, for example, in order to hold the failure diagnosis related information.

That is, the standby RAM 15 contains a readiness flag storage area and a failure diagnosis data storage area. The readiness flag storage area is an area in which to store a readiness flag to indicate a history (i.e., a presence or absence) of an execution with respect to each kind of failure diagnosis which can be executed by the VIN storage ECU 10.

For example, the VIN storage ECU 10 is supposed to be able to cause the control circuit 11 to execute a failure diagnosis relevant to emission; the failure diagnosis relevant to emission is a requirement in an emission test. That is, the VIN storage ECU 10 can execute a failure diagnosis for a catalyst, a heating catalyst, an evaporation system, a secondary air system, an A/C (air-conditioner) system coolant, an $O_2$ (oxygen) sensor, an A/F (air/fuel ratio) sensor, an $O_2$ (oxygen) sensor heater, and an EGR (exhaust gas recycling) system.

In such a case, the readiness flag storage area contains a flag indicating a history of an execution or non-execution of each of a catalyst, a heating catalyst, an evaporation system, a secondary air system, an A/C (air-conditioner) system coolant, an $O_2$ (oxygen) sensor, an A/F (air/fuel ratio) sensor, an $O_2$ (oxygen) sensor heater, and an EGR (exhaust gas recycling) system.

Here, with respect to the readiness flag, a reset status (e.g., 0 (zero)) indicates that failure diagnosis is incomplete, whereas a set status (e.g., 1 (one)) indicates that a failure diagnosis is complete.

In addition, the failure diagnosis data storage area stores failure diagnosis data that indicates an execution result of the failure diagnosis corresponding to the readiness flag. The failure diagnosis data contains data indicating (i) a presence of a failure, (ii) an absence of a failure, and (iii) unclarity in either a presence or an absence of a failure; in the reset status, the unclarity in either a presence or an absence of a failure is indicated.

In addition, the standby RAM 15 contains a rewriting history flag storage area. In the rewriting history flag storage area, a rewriting history flag indicating whether the VIN was rewritten or not is stored. Here, with respect to the rewriting history flag, a reset status (e.g., 0 (zero)) indicates that the VIN is not rewritten, whereas a set status (e.g., 1 (one)) indicates that the VIN is rewritten.

The following describes an operation of the control circuit 11.

It is further noted that a flowchart or the processing of the flowchart in the present application includes sections (also referred to as steps), which are represented, for instance, as S110. Further, each section can be divided into several sub-sections while several sections can be combined into a single section. Furthermore, each of thus configured sections can be referred to as a means or module and achieved not only as a software device but also as a hardware device.

When the subject vehicle is activated or started to operate after the ignition switch is tuned into an ON state (at the start-up of the vehicle), the control circuit 11 of the VIN storage ECU 10 executes a predetermined vehicle control by executing a program while executing a failure diagnosis corresponding to the vehicle control. The start-up point of an execution is different depending on each failure diagnosis. The control circuit 11 starts an execution of a failure diagnosis based on an output signal of a sensor just after the ignition switch is tuned into an ON state, or starts an execution of a failure diagnosis based on an execution result of a vehicle control during the travel of the subject vehicle.

The control circuit 11 then sets in the standby RAM 15 a readiness flag indicating a presence or an absence of an execution (completion) of a corresponding failure diagnosis to update a status so as to indicate a completion status where the corresponding failure diagnosis is completed. The control circuit 11 simultaneously updates the data contents of the failure diagnosis data stored in the standby RAM 15 according to a diagnostic result. In addition, in case of a failure existing, a malfunction indicator lamp (MIL) 9 is turned on (i.e., turned into ON state); the malfunction indicator lamp 9 is so arranged at a position that a vehicle occupant can see the malfunction indicator lamp 9. The failure is thus reported to the vehicle occupant.

Figure 2:
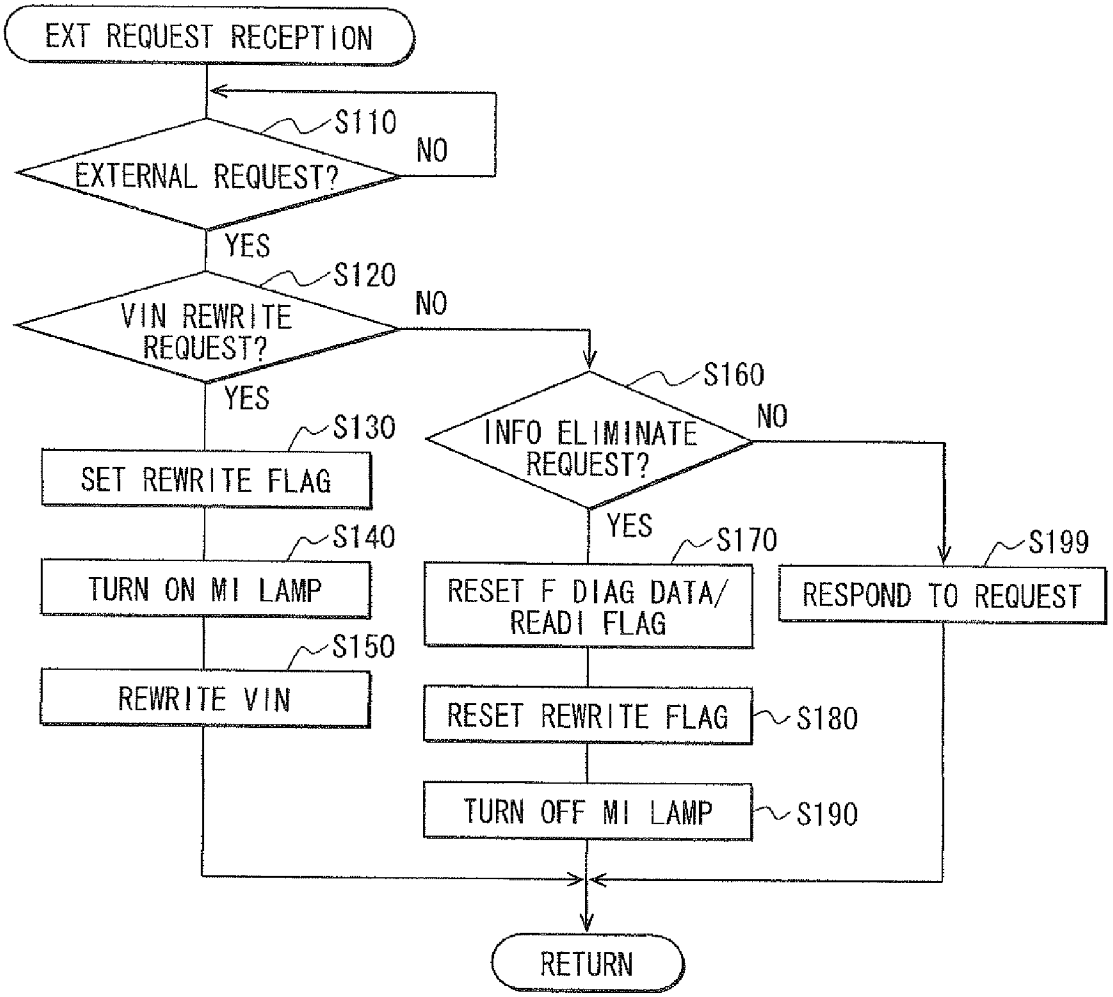
FIG. 2 is a flowchart illustrating an external request reception process executed by a control circuit.

In addition, when the scanning tool 5 is connected to the in-vehicle network via the connector CNT in the not-traveling state (i.e., in the stopping state) of the vehicle, the control circuit 11 repeatedly executes an external request reception process illustrated in FIG. 2. That is, the control circuit 11 stands by until it receives a request signal transmitted from the scanning tool 5 via the communications interface 19 (S110). When the request signal is received (S110: Yes), it is determined whether the received request signal is a VIN rewriting request signal for rewriting a VIN (S120). When it is determined that the received request signal is a VIN rewriting request signal (S120), the rewriting history flag is set in the standby RAM 15, executing an update so as to indicate that the rewriting of the VIN was made (i.e., into the set status).

Then, the control circuit 11 turns on the malfunction indicator lamp 9 connected to the control circuit itself 10 (S140) while executing a VIN rewriting process (S150). That is, the VIN stored in the EEPROM 17 is replaced by a VIN that is specified from the scanning tool 5 via the in-vehicle network. The present external request reception process is then ended.

In contrast, when the request signal received from the scanning tool 5 is not a VIN rewriting request signal (S120: No), but an elimination request signal for eliminating failure diagnosis related information (S160: Yes), the control circuit 11 advances to S170, where clearing the data in the readiness flag storage area and failure diagnosis data storage area in the standby RAM 15. That is, each readiness flag stored in the standby RAM 15 is reset (i.e., switched into the reset status), making an update to switch into a status indicating that the corresponding failure diagnosis is incomplete while resetting each failure diagnosis data. In addition, the rewriting history flag stored in the standby RAM 15 is reset (i.e., into the reset status) (S180). Then, the above malfunction indicator lamp 9 is turned into an OFF state, then ending the external request reception process.

In addition, when receiving another request signal other than the VIN rewriting request signal or the elimination request signal (S160: No), the control circuit 11 executes a process corresponding to the received request signal (S199), and ends the external request reception process. For example, according to the received request signal, the control circuit 11 transmits the failure diagnosis related information (the readiness flag and the failure diagnosis data) to the scanning tool 5, or transmits the VIN to the scanning tool 5.

Figure 3:
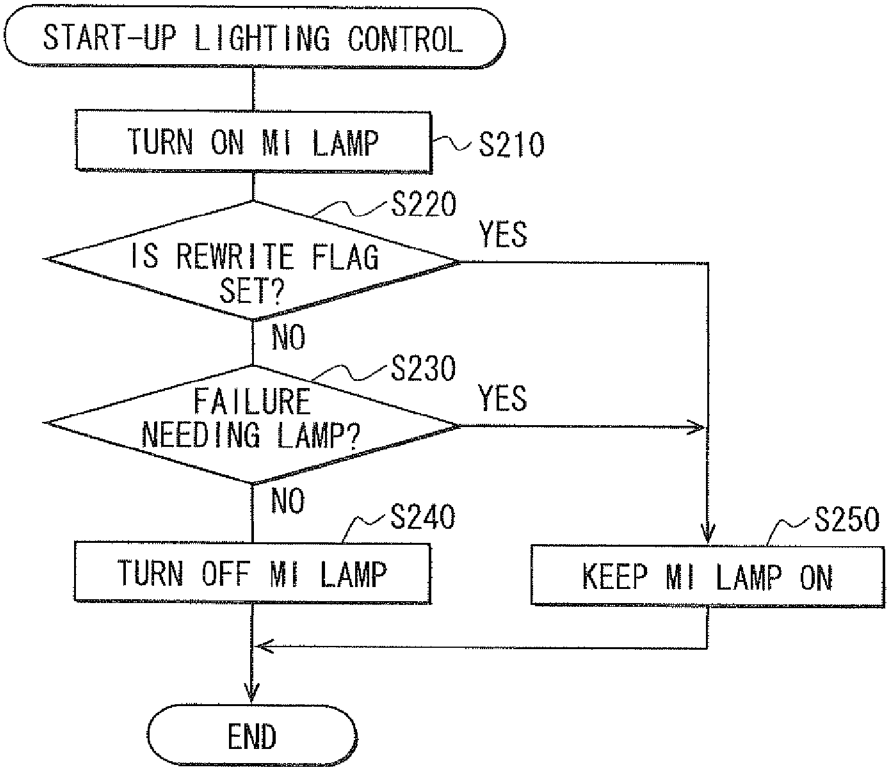
FIG. 3 is a flowchart illustrating a start-up lighting control process executed by a control circuit.

In addition, the control circuit 11 of the VIN storage ECU 10 executes a start-up lighting control process illustrated in FIG. 3 at the start-up of the subject vehicle. That is, at the start-up of the subject vehicle, the control circuit 11 causes the malfunction indicator lamp 9 connected to the control circuit 11 itself to turn into the ON state irrespective of a presence or absence of a failure (S210). Such an operation is identical to that in a conventional vehicle. Turning on of the malfunction indicator lamp 9 at the start-up of the vehicle enables the vehicle occupant to check for an anomaly of the malfunction indicator lamp 9.

Then, the control circuit 11 refers to the rewriting history flag storage area in the standby RAM 15, determining whether the rewriting history flag is set (i.e., in the set status) (S220). When the rewriting history flag is set (S220: Yes), the lighting of the malfunction indicator lamp 9 is continued (S250). Then, the start-up lighting control process is ended.

In contrast, when the rewriting history flag is reset (i.e., in the reset status) (S220: No), the failure diagnosis data storage area in the standby RAM 15 is referred to and it is determined whether there is arising a failure needing lighting of the malfunction indicator lamp 9. When there is arising a failure (S230: Yes), the lighting of the malfunction indicator lamp 9 is continued (S250). Then, the start-up lighting control process is ended.

In contrast, when the rewriting history flag is reset and it is determined that there is not arising a failure needing the lighting of the malfunction indicator lamp 9 (S230: No), the malfunction indicator lamp 9 is turned into the OFF state (S240). Then, the start-up lighting control process is ended.

Thus, in the present example, when the rewriting of the YIN is executed and the rewriting history flag is set, the malfunction indicator lamp 9 is turned into the ON state so as to notify a vehicle occupant or an operator, who inspects the vehicle, of the presence of the failure.

Figure 4:
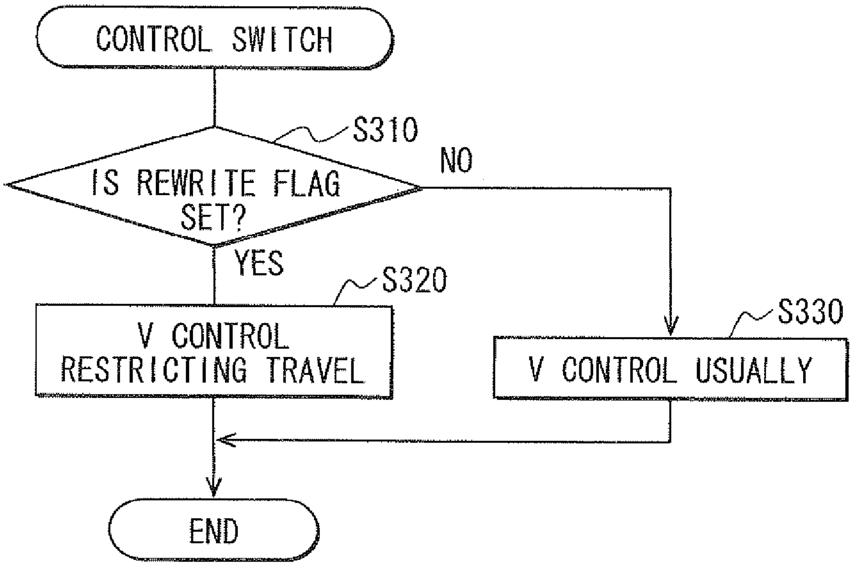
FIG. 4 is a flowchart illustrating a control switchover process executed by a control circuit.

In addition, in the present example, when the rewriting history flag is set, the mode of vehicle control is changed so that the travel of the vehicle may be restricted. In detail, prior to the start of the vehicle control, the control circuit 11 executes a control switchover process illustrated in FIG. 4 at the start-up of the vehicle, and specifically changes the mode of vehicle control according to the status of the rewriting history flag.

As illustrated in FIG, 4, as starting a control switchover process, the control circuit 11 refers to the rewriting history flag storage area in the standby RAM 15, determining whether the rewriting history flag is set (S310). When being reset (S310: No), a usual vehicle control is started (S320). When being set (S310: Yes), a vehicle control is started which restricts the travel of the subject vehicle (S330). For example, a vehicle control is executed by cutting a fuel so as to restrict the travel speed of the vehicle. In addition, another vehicle control is executed by cutting off the ignition so as to restrict the travel of the vehicle (or so as to prohibit the travel of the vehicle). In addition, yet another vehicle control is executed by setting a parameter value used for the vehicle control to an abnormal value so as to restrict the travel of the vehicle (or so as to prohibit the travel of the vehicle).

The communications system 1 of the present first example is thus explained above. The above configuration operates as follows. When the VIN storage ECU 10 rewrites a VIN, the rewriting history flag is set (switched into the set status) so that the history of the rewriting is stored in the standby RAM 15. The rewriting history flag is maintained set (in the set status) up to a time when the failure diagnosis related information (the readiness flag and the failure diagnosis data) is reset (turned into the reset status). When the failure diagnosis related information is reset, the rewriting history flag is reset (turned into the reset status).

Therefore, according to the present example, the status of the rewriting history flag is confirmed, enabling the specification or determination as to whether the failure diagnosis related information stored in the VIN storage ECU 10 is one before or after the rewriting of the VIN.

For instance, a person replaces the VIN storage ECU 10 of an abnormal vehicle having a failure with a VIN storage ECU 10 having been attached to a normal vehicle having no failure, while rewriting the VIN from the VIN pertinent to the normal vehicle into the VIN pertinent to the abnormal vehicle. The person may pretend that the failure diagnosis related information contained in the VIN storage ECU 10 attached to the normal vehicle is pertinent to the VIN storage ECU 10 of the abnormal vehicle. In this regard, however, such an abuse or injustice can be discovered by referring to the rewriting history flag via the scanning tool 5, or checking for the lighting of the malfunction indicator lamp 9.

Therefore, the present example can help prevent such an abnormal vehicle from passing an inspection unjustly. For example, there may be a case that the VIN storage ECU 10 executes at least one failure diagnosis regulated or imposed by the emission test, and keeps the readiness data and failure diagnosis data in storage. In such a case, adopting of the configuration of the present example helps prevent an abnormal vehicle from passing the emission test as a result of the exchange of the VIN storage ECUs 10.

Further, under the present example, the failure diagnosis related information is stored in the standby RAM 15, while the rewriting history flag is also stored in the standby RAM 15. Thus when the battery 7 is removed to cut off the electric power supply to the standby RAM 15, both the failure diagnosis related information and the rewriting history flag can be reset simultaneously. Therefore, after the rewriting the VIN, the failure diagnosis related information is reset by receiving an elimination request, or by removing the battery, thereby erasing the VIN rewriting history. This cancels the anomaly notification by the malfunction indicator lamp 9. As long as there is no anomaly in the vehicle, the vehicle can be made to pass justly the vehicle inspection such as an emission test.

In addition, according to the present example, under the status where the rewriting history flag is set, the travel of the vehicle is restricted, thereby disabling an unjust vehicle to travel a road. This helps prevent a damage against the safety of traffic. In addition, this helps prevent the exhaust gas which does not match environmental standards from emitting to worsen the environment.

Incidentally, the above failure diagnosis related information is stored or managed only in the VIN storage ECU 10. Without need to be limited thereto, the failure diagnosis related information may be shared by the VIN storage ECU 10 and the non-VIN storage ECU 20.

Figure 5A:
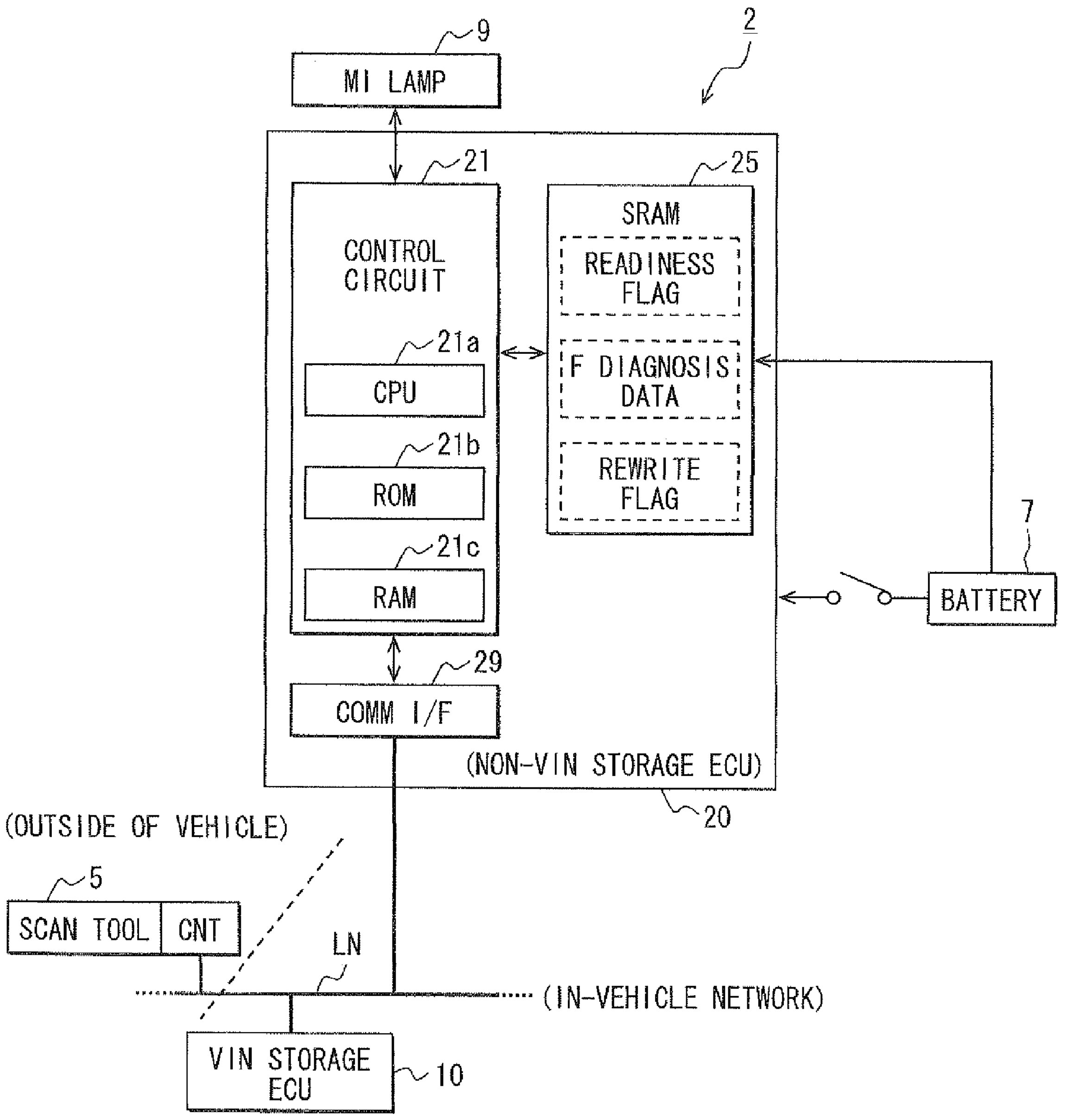
FIGS. 5A, 5B are diagrams for explaining a communications system according to a second example.

In addition, as illustrated in FIG. 5A, the malfunction indicator lamp 9 may be connected to the non-VIN storage ECU 20. In such a case, another rewriting history flag storage area may be stored in a standby RAM 25 of the non-VIN storage ECU 20 to which the malfunction indicator lamp 9 is connected, as illustrated in FIG. 5A. It is thus possible to make the malfunction indicator lamp 9 turn on at the time of rewriting the VIN.

Second Example

Figure 5B:
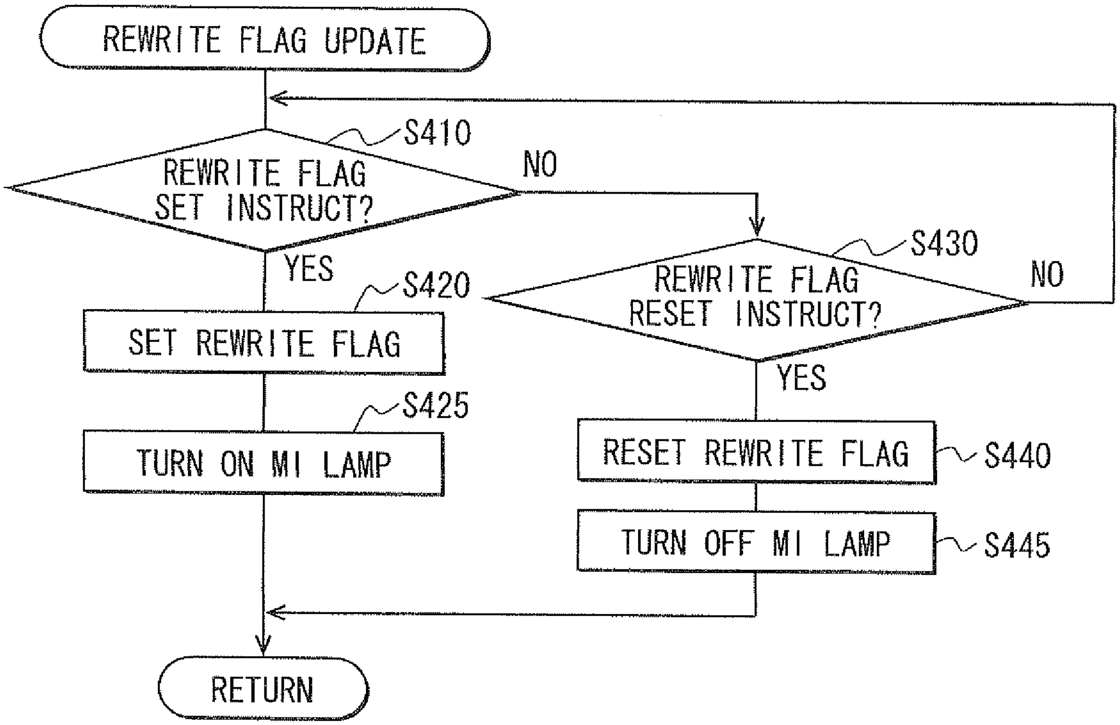

Then, the communications system 2 of a second example will be explained using FIG. 5A and FIG. 5B. It is noted that the communications system 2 of the second example has a configuration equivalent to that of the communications system 1 in FIG. 1 of the first example except that the malfunction indicator lamp 9 is connected to the non-VIN storage ECU 20. The VIN storage ECU 10 in the second example is slightly different from that of the first example in respect of a process achieved by a program. Thus, the following will explain a configuration of the communications system 2 of the second example in respect of portions different from the first example while omitting the explanation regarding the identical portions.

FIG. 5A is a block diagram illustrating a configuration of the communications system 2 according to the second example. As illustrated in FIG. 5A, the non-VIN storage ECU 20 includes a control circuit 21, a standby RAM 25, and a communications interface 29. The control circuit 21 contains a CPU 21*a*, a ROM 21*b*, and a RAM 21*c*, and realizes the various functions by executing programs stored in the ROM 21*b*.

The control circuit 21 executes vehicle control and failure diagnosis by execution of the program, and also communicates with other devices such as the VIN storage ECU 10 or scanning tool 5 via the communications interface 29. When the scanning tool 5 is connected, the request signal from the scanning tool 5 is received; when receiving the elimination request signal of the failure diagnosis related information from the scanning tool 5, the failure diagnosis related information stored in the standby RAM 25 is reset.

In addition, the standby RAM 25 of the non-VIN storage ECU 20 contains a readiness flag storage area and a failure diagnosis data storage area for holding and managing the failure diagnosis related information (the readiness flag and the failure diagnosis data) while containing a rewriting history flag storage area. The control circuit 21 repeatedly executes a process illustrated in FIG. 5B and updates the rewriting history flag.

That is, when receiving communications data to require setting of the rewriting history flag from the VIN storage ECU 10 (S410: Yes), the control circuit 21 changes the rewriting history flag into the set status (S420), and turns on the malfunction indicator lamp 9 connected to the control circuit 21 itself (S425). In contrasts, when receiving communications data to require resetting of the rewriting history flag from the VIN storage ECU 10 (S430: Yes), the control circuit 21 changes the rewriting history flag into the reset status (S440), and turns off the malfunction indicator lamp 9 connected to the control circuit 21 itself (S445). However, when a failure is arising which needs to cause the malfunction indicator lamp 9 to be turned on, the malfunction indicator lamp 9 is not caused to turn off at S445. FIG. 5B is a flowchart illustrating a rewriting history flag update process executed by the control circuit 21.

In addition, the control circuit 21 of the non-VIN storage ECU 20 executes a start-up lighting control process illustrated in FIG. 3 at the start-up of the subject vehicle. In contrast, when the control circuit 11 of the VIN storage ECU 10 sets the rewriting history flag in the own standby RAM 15 at S130, the control circuit 11 communicates with the non-VIN storage ECU 20 to which the malfunction indicator lamp 9 is connected, and requires the non-VIN storage ECU 20 to set the rewriting history flag, thereby causing the rewriting history flag of the non-VIN storage ECU 20 to which the malfunction indicator lamp 9 is connected to be in the set status. Then when an elimination request signal for the failure diagnosis related information is received from the scanning tool 5, the control circuit 11 resets the failure diagnosis related information and the rewriting history flag stored in the own standby RAM 15 (S170, S180). At S180, simultaneously, the control circuit 11 communicates with the non-VIN storage ECU 20 to which the malfunction indicator lamp 9 is connected, and requires the non-VIN storage ECU 20 to reset the rewriting history flag, thereby causing the rewriting history flag of the non-VIN storage ECU 20, which the malfunction indicator lamp 9 is connected to, be reset (in the reset status). In addition, except that not executing the processing at S140, S190 or the start-up lighting control process illustrated in FIG. 3, the control circuit 11 of the VIN storage ECU 10 of the present example executes the same processing as that of the first example.

According to the communications system 2 of the present example, using the malfunction indicator lamp 9 connected to the non-VIN storage ECU 20, the vehicle occupant or operator of the vehicle inspection can be notified that although the VIN is rewritten in the VIN storage ECU 10, the failure diagnosis related information is still old.

In addition, according to the communications system 2, the rewriting history flag is stored in more than one storage. There may be a case where since the rewriting history flag stored in one storage volatilizes from any cause, the rewriting history flag is reset in spite of not resetting failure diagnosis related information. Even in such a case, an error in the determination as to whether the failure diagnosis related information is reset can be prevented. That is, the operator of the vehicle inspection refers to the rewriting history flag stored in more than one electronic control unit 10, 20 via the scanning tool 5; thereby, even if one of them indicates the incorrect value due to the volatilization, it can be determined accurately whether the failure diagnosis related information is reset after the VIN rewriting.

It is noted that an advantage of storing the rewriting history flag in more than one storage may be utilized more as follows. For instance, in the start-up lighting control process illustrated in FIG. 3 executed at the start-up of the subject vehicle, the control circuit 21 of the non-VIN storage ECU 20, which the malfunction indicator lamp 9 is connected to, may refer to the own rewriting history flag while communicating with the VIN storage ECU 10 to also refer to the rewriting history flag in the VIN storage ECU 10. When the rewriting history flag is set in at least one of the ECUs 10, 20, it may be determined affirmatively (Yes) at S220, thereby turning on the malfunction indicator lamp 9.

In addition, in the communications system 2 according to the present example, the non-VIN storage ECU 20 is controlled by the VIN storage ECU 10, so that the own rewriting flag is set or reset. Alternatively, the non-VIN storage ECU 20 may be configured as follows. When receiving the elimination request signal for the failure diagnosis related information from the scanning tool 5, the non-VIN storage ECU 20 may reset not only the failure diagnosis related information but also the rewriting history flag stored in the own standby RAM 25.

The elimination request signal for the failure diagnosis related information mentioned above is transmitted as a signal having no specific destination address from the scanning tool 5. That is, the elimination request signal is broadcast via the in-vehicle network. Therefore, the reset action for the failure diagnosis related information corresponding to the broadcast elimination request signal is simultaneously executed in each of all the electronic control units 10, 20 connected to the in-vehicle network.

The non-VIN storage ECU 20 may be configured such that when the failure diagnosis related information stored in the own standby RAM 25 is reset, the rewriting history flag also stored in the own standby RAM 25 is simultaneously reset. In such a configuration, without need of communications with the VIN storage ECU 10, the non-VIN storage ECU 20 can reset the rewriting history flag in the own storage in conjunction with the reset action of resetting the failure diagnosis related information in the VIN storage ECU 10.

In addition, when anticipating the volatilization of the rewriting history flag, the rewriting history flag may be stored in another electronic control unit in the communications system 1, 2 as well as the non-VIN storage ECU 20 connected to the malfunction indicator lamp 9. In such a configuration, it can be determined accurately whether the failure diagnosis related information is reset after rewriting the VIN.

Third Example

The following will explain a communications system 3 of a third example using FIGS. 6, 7A, 7B, 8. It is noted that except that the malfunction indicator lamp 9 is connected to the non-VIN storage ECU 20, the communications system 3 of the third example has a hardware configuration identical to that of the communications system 1 illustrated in FIG. 1. Therefore, the following will explain selectively a featured point in the present example such as the processing executed by the control circuit 11 of the VIN storage ECU 10, and the processing executed by the control circuit 21 of non-VIN storage ECU 20.

Figure 6:
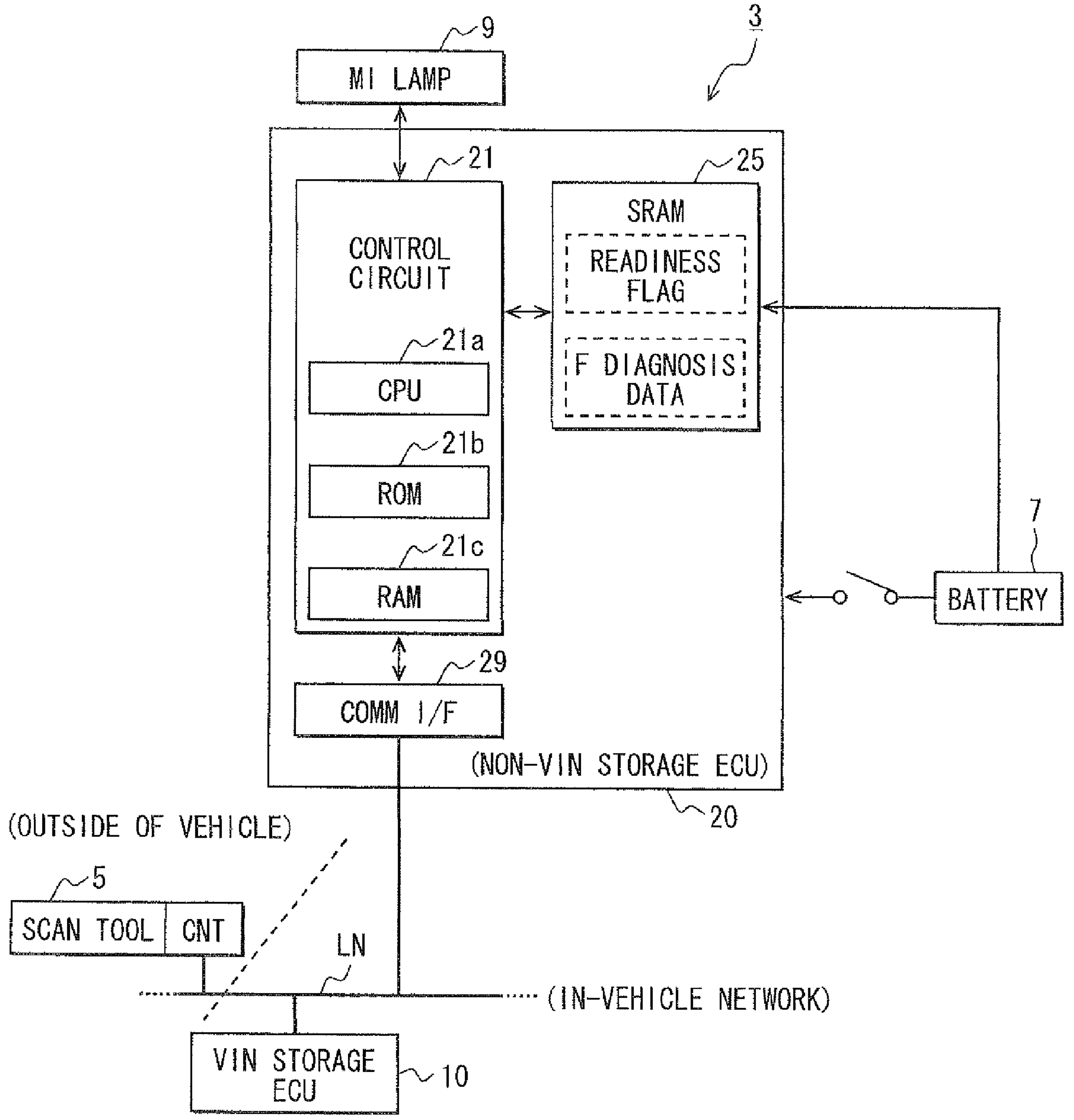
FIG. 6 is a block diagram illustrating a configuration of a communications system according to a third example.

Unlike the second example, as illustrated in FIG. 6, the communications system 3 of the present example is not provided with a rewriting history flag storage area in the non-VIN storage ECU 20 to which the malfunction indicator lamp 9 is connected. Here, using a function of the non-VIN storage ECU 20 to turn on the malfunction indicator lamp 9 according to a detection of an anomaly in the communications, the malfunction indicator lamp 9 is caused to turn on at the time of rewriting of VIN. That is, the communications system 3 of the present example relies on the premise that when detecting that an electronic control unit with which the communication via the in-vehicle network is interrupted, the non-VIN storage ECU 20 connected to the malfunction indicator lamp 9 turns on the malfunction indicator lamp 9.

Figure 7A:
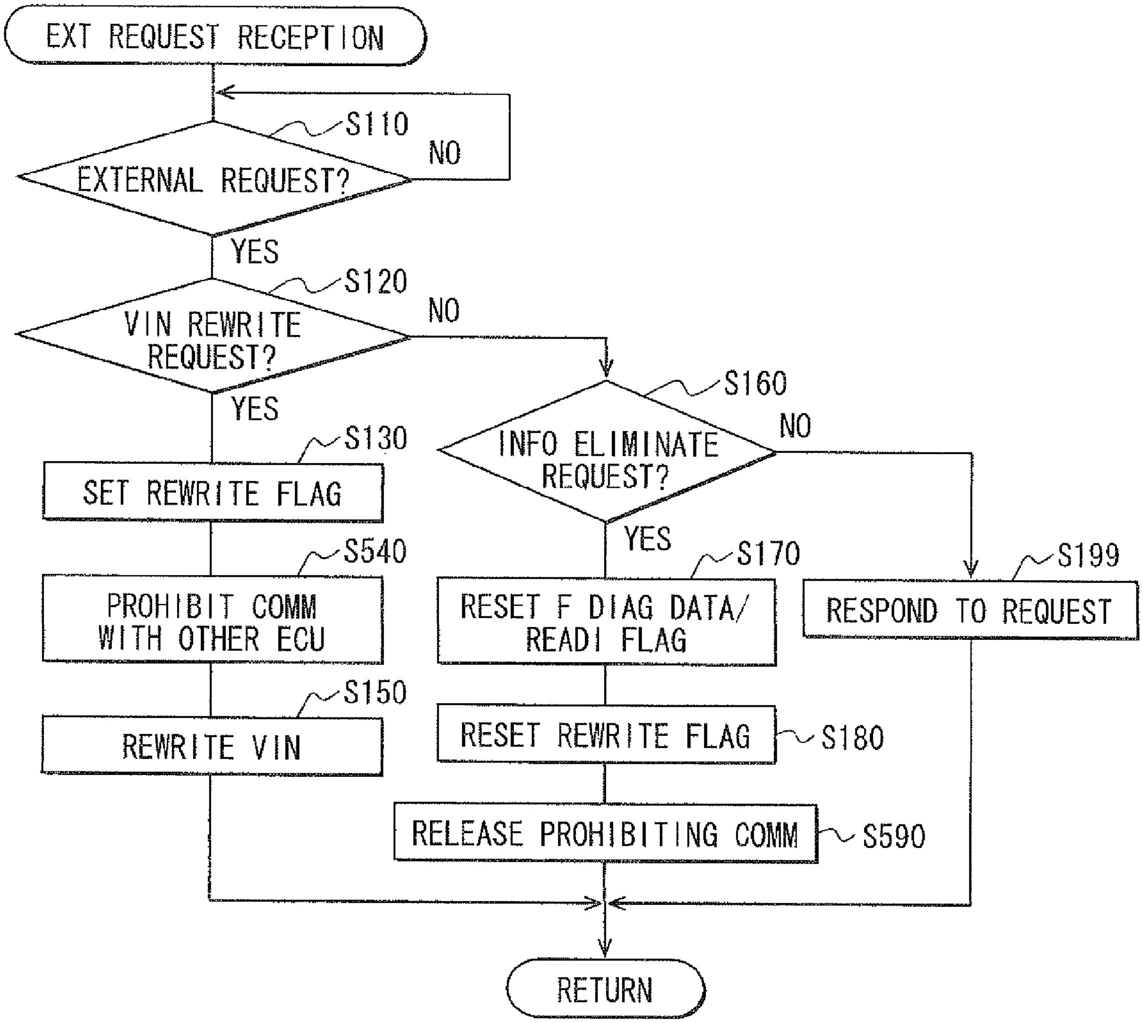
FIGS. 7A, 7B are flowcharts illustrating processes executed by a control circuit of the communications system according to the third example.

The control circuit 11 of the VIN storage ECU 10 in the communications system 3 executes an external request reception process illustrated in FIG. 7A instead of the external request reception process illustrated in FIG. 2. FIG. 7A is a flowchart illustrating an external request reception process executed by the control circuit 11.

The comparison of FIG. 7A with FIG. 2 exhibits that the external request reception process illustrated in FIG. 7A replaces S140, S190 in FIG. 2 with S540, S590, respectively, and executes other steps like in the first example.

That is, when receiving the VIN rewriting request signal, the control circuit 11 of the VIN storage ECU 10 sets the rewriting history flag (into the set status) in the standby RAM 15 (S130) and then switches the communications interface 19 into the OFF state, thereby interrupting or stopping the communications between another device and the VIN storage ECU 10 itself (S540). Then, the VIN rewriting process is executed (S150).

In addition, when receiving the elimination request signal for the failure diagnosis related information, the control circuit 11 resets the readiness flag and the failure diagnosis data stored in the standby RAM 15 (S170) and resets the rewriting history flag (S180), then switching the communications interface 19 from the OFF state to the ON state (operating state). The communication prohibition state where the communications is prohibited between another device and the VIN storage ECU 10 itself is thus released, resuming the communications between another device and the VIN storage ECU 10 itself (S590).

Figure 7B:
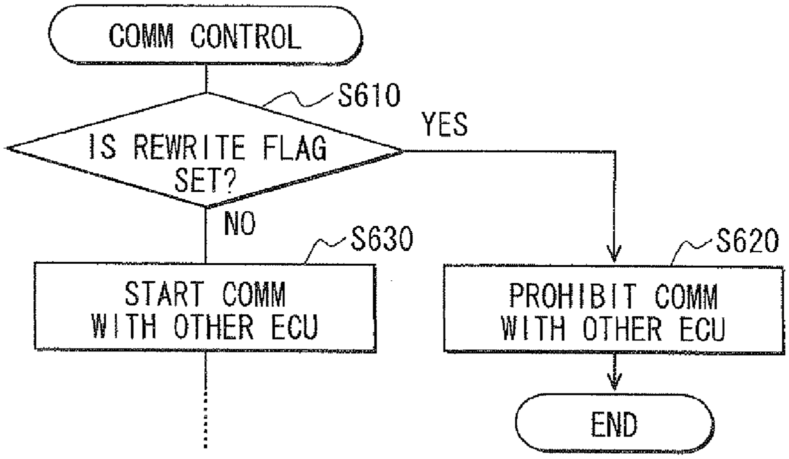

In addition, the control circuit 11 replaces the start-up lighting control process illustrated in FIG. 3 with a communications control process illustrated in FIG. 7B at the start-up of the subject vehicle. FIG. 7B is a flowchart illustrating a communications control process executed by the control circuit 11. As the communications control process is started, the control circuit 11 refers to the standby RAM 15 of the VIN storage ECU 10, determining whether the rewriting history flag is set. When the rewriting history flag is set (S610: Yes), the communications interface 19 is maintained in the OFF state, prohibiting the communications (S620). Then, the present communications control process is ended. In contrast, when the rewriting history flag is in the reset status (S610: No), the communications interface 19 is turned into the ON state, thereby starting the communications with another electronic control unit via the communications interface 19 (S630).

Figure 8:
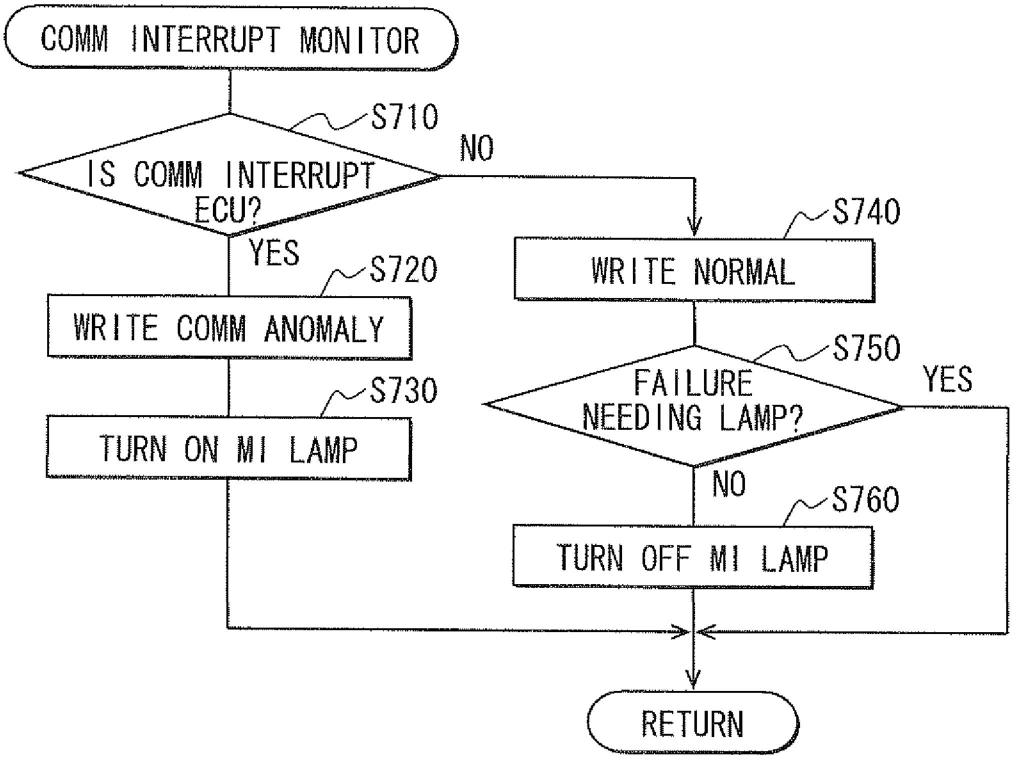
FIG. 8 is a flowchart illustrating another process executed by a control circuit of the communications system according to the third example.

The control circuit 21 of the non-VIN storage ECU 20 connected to the malfunction indicator lamp 9 repeatedly executes a communications interruption monitoring process illustrated in FIG. 8 after the start-up of the subject vehicle. As the communications interruption monitoring process is started, the control circuit 21 determines that there is an electronic control unit with which the communications are interrupted within the in-vehicle network (there is an electronic control unit that is disabled in communicating with the non-VIN storage ECU 20) based on the communications state with each electronic control unit connected via the in-vehicle network (S710). For example, an address list for each electronic control unit connected to the in-vehicle network may be provided in the communications system 3. Thus, when the communications are determined to be enabled with all the electronic units of which addresses are registered in the address list, the control circuit 21 determines that there is no electronic control unit with which the communications are interrupted (S710: No). When determining otherwise, the control circuit 21 determines that there is an electronic control unit with which the communications are interrupted (S710: Yes).

When it is determined that there is an electronic control unit with which the communications are interrupted within the in-vehicle network (S710: Yes), the failure diagnosis data relevant to the communications in the failure diagnosis data storage area of the standby RAM 15 is updated into the failure diagnosis data indicating an anomaly in the communications. The anomaly in the communications is written in the standby RAM 15 (S720), and the malfunction indicator lamp 9 is caused to turn on (S730). Then, the present communications interruption monitoring process is ended. In addition, when the communications interruption is already detected and the information on the anomaly in the communications is stored in the standby RAM 15, the processing at S720 and S730 is omitted without need to execute it redundantly.

In contrast, when it is determined that there is no electronic control unit with which the communications are interrupted within the in-vehicle network (S710: No), the failure diagnosis data relevant to the communications is updated into the failure diagnosis data indicating a normalcy in the communications. The information on the anomaly in the communications is thus erased from the standby RAM 15 (S740). Then, it is determined whether an another failure is arising which requires the malfunction indicator lamp 9 to turn on by referring to the other failure diagnosis data stored in the failure diagnosis data storage area. If no failure is arising (S750: No), the malfunction indicator lamp 9 is caused to turn off (S760) and the communications interruption monitoring process is ended. When another failure is arising (S750: Yes), the communications interruption monitoring process is ended without turning off the malfunction indicator lamp 9.

The communications system 3 of the present third example is thus explained above. According to the communications system 3, when an anomaly in the communications occurs, the function of non-VIN storage ECU 20 which causes the malfunction indicator lamp 9 to turn on is used. Turning on or off of the malfunction indicator lamp 9 is indirectly controlled from the VIN storage ECU 10 which is not connected directly to the malfunction indicator lamp 9. Therefore, according to the present example, an operation to cause the malfunction indicator lamp 9 to continue turning on from when the VIN is rewritten to when the failure diagnosis related information is reset can be realized by using the existing function, thereby reducing costs.

It is noted that the present example also contains an idea of substituting the existing failure diagnosis data for the rewriting history flag. Such an idea is applied to the communications system 1 of the first example where the malfunction indicator lamp 9 is connected to the VIN storage ECU 10, similarly. That is, instead of setting or resetting the dedicated rewriting history flag, an existing failure diagnosis data corresponding to a diagnosis item which causes the malfunction indicator lamp 9 to turn on when a failure arises is substituted. That is, at the time of rewriting the VIN, the update is made so as to switch the existing failure diagnosis data into the failure diagnosis data indicating the presence of a failure, thereby causing the malfunction indicator lamp 9 to turn on. If a configuration is provided which uses the existing failure diagnosis data as a rewriting history flag, resetting the existing failure diagnosis data enables an automatic erasure of the rewriting history of VIN, thereby simplifying the configuration of the system.

Further, in the communications systems 1, 2, and 3 of the first, second, and third examples mentioned above, the rewriting history flag is reset on condition that the failure diagnosis related information is reset. In order to prevent an unjust vehicle from passing an inspection, the failure diagnosis related information of an inspected vehicle is only required to be pertinent to that inspected vehicle. For example, the rewriting history flag may be reset on condition that a usual failure diagnosis was executed after the rewriting the VIN.

Fourth Example

The following describes a fourth example. A communications system of the fourth example has a configuration where the control circuit 11 of the first example repeatedly executes a rewriting history reset process illustrated in FIG. 9A after the start-up of the subject vehicle.

Figure 9A:
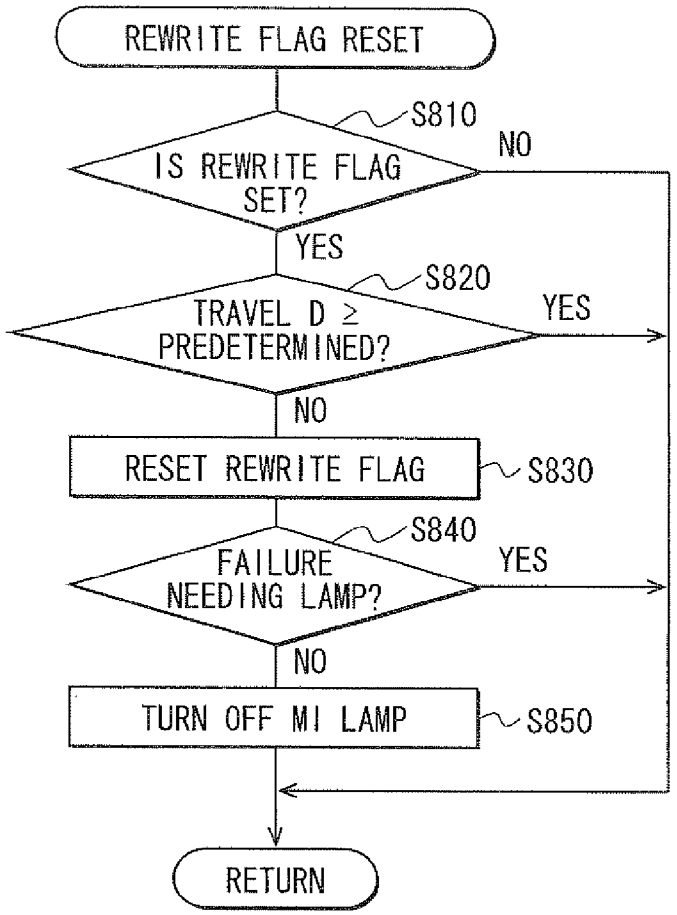
FIGS. 9A, 9B are flowcharts illustrating rewriting history reset processes according to a fourth example.

As starting a rewriting history reset process in FIG. 9A, the control circuit 11 refers to the rewriting history flag storage area in the standby RAM 15 of the VIN storage ECU 10, determining whether the rewriting history flag is set (S810). When determining that the rewriting history flag is reset (S810: No), the rewriting history reset process is ended, without executing processing after S820. In contrast, when the rewriting history flag is set (S810: Yes), it is determined whether the travel distance of the subject vehicle after the rewriting the VIN is equal to less than a predetermined distance (S820). It is noted that such a predetermined distance is previously determined at a design stage to be greater than a reference travel distance, which is defined such that if the subject vehicle travels the reference distance after the rewriting the VIN, failure diagnoses corresponding to the failure diagnosis related information stored in the VIN storage ECU 10 are thoroughly executed. The travel distance after rewriting the VIN is specified as follows. For example, a value of the distance meter at the time of rewriting the VIN is stored and compared with a value of the distance meter after the vehicle travels subsequent to rewriting the VIN.

When it is determined that the travel distance after rewriting the VIN is equal to or less than the predetermined distance (S820: Yes), the rewriting history reset process is ended. When it is determined that the travel distance is greater than the predetermined distance (S820: No), the rewriting history flag stored in the standby RAM 15 is reset (S830).

Then, it is determined whether there is arising a failure needing lighting of the malfunction indicator lamp 9 by referring to the other failure diagnosis data stored in the failure diagnosis data storage area (S840). If no failure is arising (S840: No), the malfunction indicator lamp 9 is caused to turn off (S850) and the rewriting history reset process is ended. When another failure is arising (S840: Yes), the rewriting history reset process is ended without turning off of the malfunction indicator lamp 9.

According to the communications system of the present example, a user need not execute an operation to eliminate the failure diagnosis related information. Thus, it is convenient for the user. The idea of the present example is applicable also to the communications system 2 of the second example. In such a case, when resetting the rewriting history flag stored in the standby RAM 15 at S830, the control circuit 11 just only needs to reset the rewriting history flag stored in another electronic control unit using the communications via the in-vehicle network.

Figure 9B:
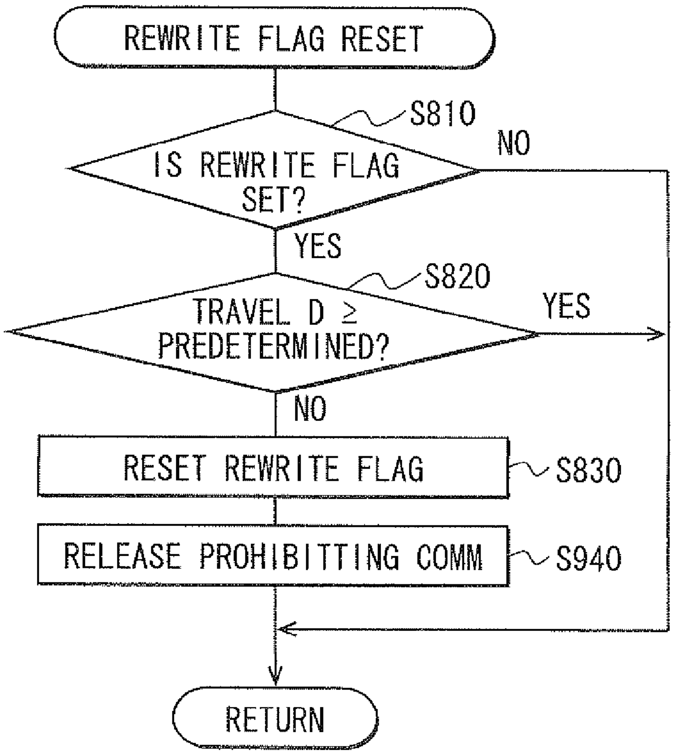

Further, the idea of the present example is applicable also to the communications system 3 of the third example. in this case, the control circuit 11 only needs to execute the rewriting history reset process illustrated in FIG. 9B, instead of executing the rewriting history reset process illustrated in FIG. 9A. That is, after executing S830, the control circuit 11 advances to S940, where to switch the communications interface 19 from the OFF state to the ON state (operating state), instead of S840 and S850 illustrated in FIG. 9A. The communication prohibition state where the communications is prohibited between another device and the VIN storage ECU 10 itself is thus released, resuming the communications between another device and the VIN storage ECU 10 itself.

Functions

The readiness flag may function as failure diagnosis related information indicating an execution or a non-execution of a failure diagnosis. The failure diagnosis data may function as failure diagnosis related information indicating an execution result of a failure diagnosis, The standby RAM 15 may function as a backup memory. The malfunction indicator lamp 9 may function as an alarm lamp.

In addition, S150 executed by the control circuit 11 may function as a rewriting section or means. S130 executed by the control circuit 11 may function as a history writing section or means. S170, S180, S830 executed by the control circuit 11 may function as an elimination section or means. S820 executed by the control circuit 11 may function as a determination section or means.

In addition, S140, S190, S240, S250, S540, S590 executed by the control circuit 11 may function as a rewriting notification section or means. The control switchover process executed by the control circuit 11 may function as a restriction section or means. In addition, the non-VIN storage ECU 20 connected to the malfunction indicator lamp 9 may function as an alarm device.

Each or any combination of processes, functions, sections, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a non-transitory computer-readable storage media or can be downloaded via a communications network and then stored in a non-transitory computer-readable storage media.

Aspects of the disclosure described herein are set out in the following clauses.

As a first aspect of the disclosure, an electronic control unit for a vehicle is provided as follows. The electronic control unit contains a storage media that stores a vehicle identification code and failure diagnosis related information as well, the failure diagnosis related information indicating (i) an execution or a non-execution of a failure diagnosis, and (ii) an execution result of the failure diagnosis. The electronic control unit includes: a rewriting section configured to rewrite the vehicle identification code when a rewriting instruction for the vehicle identification code is inputted; a history writing section configured to write, in the storage media, history information when the rewriting section rewrites the vehicle identification code, the history information indicating an execution of the rewriting of the vehicle identification code; and an elimination section configured to eliminate the history information written by the history writing section when a prescribed condition is satisfied. Here, the elimination section eliminates the failure diagnosis related information together with the history information.

Further, in the above electronic control unit, the elimination section may eliminate the failure diagnosis related information together with the history information when an elimination instruction is inputted from a device outside of the vehicle.

According to a second aspect of the disclosure, an electronic control unit for a vehicle is provided as follows. The electronic control unit contains as storage media (i) a nonvolatile memory in which data rewriting is electrically enabled, and (ii) a volatile memory serving as a backup memory in which data storage is enabled with an electric power always supplied from a battery, the nonvolatile memory storing a vehicle identification code, the backup memory storing failure diagnosis related information that indicates an execution or a non-execution of a failure diagnosis and an execution result of the failure diagnosis. The electronic control unit includes: a rewriting section configured to rewrite the vehicle identification code when a rewriting instruction for the vehicle identification code is inputted; and a history writing section configured to write, in the backup memory, history information when the rewriting section rewrites, the history information indicating an execution of the rewriting of the vehicle identification code.

According to a third aspect of the disclosure, an electronic control unit for a vehicle is provided as follows. The electronic control unit contains a storage media that stores a vehicle identification code and failure diagnosis related information as well, the failure diagnosis related information indicating (i) an execution or a non-execution of a predetermined failure diagnosis, and (ii) an execution result of the predetermined failure diagnosis. The electronic control unit includes: a rewriting section configured to rewrite the vehicle identification code when a rewriting instruction for the vehicle identification code is inputted; a history writing section configured to write, in the storage media, history information when the rewriting section rewrites the vehicle identification code, the history information indicating an execution of the rewriting of the vehicle identification code; a determination section configured to determine whether the predetermined failure diagnosis corresponding to the failure diagnosis related information stored in the storage media is thoroughly executed after the rewriting section rewrites the vehicle identification code; and an elimination section configured to eliminate the history information written by the history writing section when the determination section determines that the predetermined failure diagnosis is thoroughly executed.

Further, as an optional aspect, the determination section may determine that the predetermined failure diagnosis is not thoroughly executed until a travel amount, which the vehicle travels after the rewriting section rewrites the vehicle identification code, exceeds a predetermined amount; and the determination section may determine that the predetermined failure diagnosis is thoroughly executed when the travel amount exceeds the predetermined amount.

According to the configuration of such a determination section, whether a failure diagnosis is executed thoroughly can be determined in an easy procedure with high accuracy.

In addition, at the time of rewriting of the vehicle identification code, it may be desirable to report an anomaly in the vehicle (anomaly that the failure diagnosis related information is still old although the vehicle identification code is rewritten) by turning on an alarm lamp mounted in the vehicle.

As an optional aspect, a rewriting notification section may be further included to cause an alarm lamp mounted in the vehicle to turn on for a duration from when the rewriting section rewrites the vehicle identification code to when the history information is eliminated from the storage media.

Such a configuration can easily notify an operator of a vehicle inspection of a vehicle anomaly that the failure diagnosis related information is still old although the vehicle identification code is rewritten. This can help prevent more accurately an unjust passage of the vehicle inspection from occurring due to the operator's check miss.

It is noted that, an alarm lamp mounted in a vehicle may be connected to another device different from the electronic control unit that stores the vehicle identification code. In such a configuration, an instruction input via an in-vehicle network may be made from the above electronic control unit storing the vehicle identification code to the device connected with the alarm lamp, so as to achieve a lighting control of the alarm lamp.

In addition, the device connected with the alarm lamp may be configured to turn on the alarm lamp when there is arising an electronic control unit of which the communications via the in-vehicle network is interrupted. In such a configuration, such a function may be utilized to indirectly control turning on or off of the alarm lamp.

That is, the electronic control unit may communicates via an in-vehicle network within the vehicle with an alarm device that is connected with the alarm lamp, the alarm device causing the alarm lamp to turn on when there is arising an electronic control unit with which communications via the in-vehicle network are interrupted. The rewriting notification section may interrupt communications with the alarm device for a duration from when the rewriting section rewrites the vehicle identification code to when the history information is eliminated from the storage media, thereby turning on the alarm lamp through the alarm device.

Thus, turning on or off of the alarm lamp may be achieved by using a function of a device connected with an alarm lamp. The anomaly that although a vehicle identification code is rewritten, the failure diagnosis related information is still old can be reported via the lighting of the alarm lamp. This can achieve a system which reports an anomaly via the alarm lamp with low costs.

As an optional aspect, a restriction section may be further included to restrict a travel of the vehicle for a duration from when the rewriting section rewrites the vehicle identification code to when the history information is eliminated from the storage media.

Here, the restriction includes a restriction to stop any travel of the vehicle and a restriction to partially disable the travel of the vehicle. This helps prevent a damage against the safety of traffic due to the travel of the unjust vehicle. In addition, this helps prevent an exhaust gas which does not match environmental standards from emitting to worsen the environment.

According to a fourth aspect of the disclosure, an information management system for a vehicle is provided as follows. The system includes: at least two electronic control units including a first electronic control unit and at least one second electronic control unit, the at least two electronic control units being communicated via an in-vehicle network within the vehicle, the first electronic control unit storing a vehicle identification code, at least the first electronic control unit out of the at least two electronic control units storing failure diagnosis related information indicating an execution or a non-execution of a failure diagnosis and an execution result of the failure diagnosis. The first electronic control unit includes: a rewriting section configured to rewrite the vehicle identification code when a rewriting instruction for the vehicle identification code is inputted; a history writing section configured to write, in a storage media of one of the at least one second control unit, history information when the rewriting section rewrites, the history information indicating an execution of the rewriting of the vehicle identification code; and an elimination section configured to eliminate the failure diagnosis related information from a storage media contained in the first electronic control unit when an elimination instruction is inputted from a device outside of the vehicle via the in-vehicle network. Here, the one of the at least one second control unit that stores the history information eliminates the history information from the storage media contained in the one of the at least one second electronic control unit when the elimination instruction is inputted via the in-vehicle network.

Further, the technique of storing the history information in the electronic control unit other than the electronic control unit storing the vehicle identification code may pose the following problem. An unjust passage of a vehicle inspection may arise by further replacing unjustly the electronic control unit storing the history information.

As an optional aspect, the history writing section may further write the history information in a storage media contained in the first electronic control unit; and the elimination section may eliminate the history information together with the failure diagnosis related information.

That is, while the history information may be managed by a primary device, the same history information may be also managed in reserve by a secondary device. Thus, the above system is so configured that the history information is stored in more than one storage, more certainly helping prevent an unjust passage of a vehicle inspection from occurring. In an environment to have a possibility for the stored history information to volatile, storing the history information in more than one storage may suppress the following problem. That is, although the failure diagnosis related information is erased due to volatilization, such an erasure cannot be determined from an outside.

As an optional aspect, the one of the at least one second electronic control unit, which stores the history information, may be connected with an alarm lamp, and may cause the alarm lamp to turn on from when the history information is stored in the storage media contained in the one of the at least one second electronic control unit to when the history information is eliminated from the storage media contained in the one of the at least one second electronic control unit.

Also with this technique, an anomaly in the vehicle can be reported via the alarm lamp; an unjust passage of a vehicle inspection can be suppressed.

It will be obvious to those skilled in the art that various changes may be made in the above-described embodiments of the present invention. However, the scope of the present invention should be determined by the following claims.

What is claimed:

1. An electronic control unit for a vehicle, the electronic control unit containing a storage media that stores a vehicle identification code and failure diagnosis related information as well, the failure diagnosis related information indicating (i) an execution or a non-execution of a failure diagnosis, and (ii) an execution result of the failure diagnosis, the electronic control unit comprising:

a rewriting section configured to rewrite the vehicle identification code when a rewriting instruction for the vehicle identification code is inputted;

a history writing section configured to write, in the storage media, history information when the rewriting section rewrites the vehicle identification code, the history information indicating an execution of the rewriting of the vehicle identification code; and an elimination section configured to eliminate the history information written by the history writing section when a prescribed condition is satisfied, wherein the elimination section eliminates the failure diagnosis related information together with the history information.

2. The electronic control unit according to claim 1, wherein the elimination section eliminates the failure diagnosis related information together with the history information when an elimination instruction is inputted from a device outside of the vehicle.

3. An electronic control unit for a vehicle, the electronic control unit containing as storage media (i) a nonvolatile memory in which data rewriting is electrically enabled, and (ii) a volatile memory serving as a backup memory in which data storage is enabled with an electric power always supplied from a battery, the nonvolatile memory storing a vehicle identification code, the backup memory storing failure diagnosis related information that indicates an execution or a non-execution of a failure diagnosis and an execution result of the failure diagnosis, the electronic control unit comprising:

a rewriting section configured to rewrite the vehicle identification code when a rewriting instruction for the vehicle identification code is inputted; and a history writing section configured to write, in the backup memory, history information when the rewriting section rewrites, the history information indicating an execution of the rewriting of the vehicle identification code.

4. An electronic control unit for a vehicle, the electronic control unit containing a storage media that stores a vehicle identification code and failure diagnosis related information as well, the failure diagnosis related information indicating (i) an execution or a non-execution of a predetermined failure diagnosis, and (ii) an execution result of the predetermined failure diagnosis, the electronic control unit comprising:

a rewriting section configured to rewrite the vehicle identification code when a rewriting instruction for the vehicle identification code is inputted;

a history writing section configured to write, in the storage media, history information when the rewriting section rewrites the vehicle identification code, the history information indicating an execution of the rewriting of the vehicle identification code;

a determination section configured to determine whether the predetermined failure diagnosis corresponding to the failure diagnosis related information stored in the storage media is thoroughly executed after the rewriting section rewrites the vehicle identification code; and an elimination section configured to eliminate the history information written by the history writing section when the determination section determines that the predetermined failure diagnosis is thoroughly executed.

5. The electronic control unit according to claim 4, wherein the determination section determines that the predetermined failure diagnosis is not thoroughly executed until a travel amount, which the vehicle travels after the rewriting section rewrites the vehicle identification code, exceeds a predetermined amount; and the determination section determines that the predetermined failure diagnosis is thoroughly executed when the travel amount exceeds the predetermined amount.

6. The electronic control unit according to claim 1, further comprising:

a rewriting notification section configured to cause an alarm lamp mounted in the vehicle to turn on for a duration from when the rewriting section rewrites the vehicle identification code to when the history information is eliminated from the storage media.

7. The electronic control unit according to claim 6, communicating via an in-vehicle network within the vehicle with an alarm device that is connected with the alarm lamp, the alarm device causing the alarm lamp to turn on when there is arising an electronic control unit with which communications via the in-vehicle network are interrupted, wherein the rewriting notification section interrupts communications with the alarm device for a duration from when the rewriting section rewrites the vehicle identification code to when the history information is eliminated from the storage media, thereby turning on the alarm lamp through the alarm device.

8. The electronic control unit according to claim 1, further comprising:

a restriction section configured to restrict a travel of the vehicle for a duration from when the rewriting section rewrites the vehicle identification code to when the history information is eliminated from the storage media.

9. An information management system for a vehicle, the system comprising:

at least two electronic control units including a first electronic control unit and at least one second electronic control unit, the at least two electronic control units being communicated via an in-vehicle network within the vehicle, the first electronic control unit storing a vehicle identification code, at least the first electronic control unit out of the at least two electronic control units storing failure diagnosis related information indicating an execution or a non-execution of a failure diagnosis and an execution result of the failure diagnosis, the first electronic control unit comprising:

a rewriting section configured to rewrite the vehicle identification code when a rewriting instruction for the vehicle identification code is inputted;

a history writing section configured to write, in a storage media of one of the at least one second control unit, history information when the rewriting section rewrites, the history information indicating an execution of the rewriting of the vehicle identification code; and an elimination section configured to eliminate the failure diagnosis related information from a storage media contained in the first electronic control unit when an elimination instruction is inputted from a device outside of the vehicle via the in-vehicle network, wherein the one of the at least one second control unit that stores the history information eliminates the history information from the storage media contained in the one of the at least one second electronic control unit when the elimination instruction is inputted via the in-vehicle network.

10. The information management system according to claim 9, wherein:

the history writing section further writes the history information in a storage media contained in the first electronic control unit; and the elimination section eliminates the history information together with the failure diagnosis related information.

11. The information management system according to claim 9, wherein the one of the at least one second electronic control unit, which stores the history information, is connected with an alarm lamp, and causes the alarm lamp to turn on from when the history information is stored in the storage media contained in the one of the at least one second electronic control unit to when the history information is eliminated from the storage media contained in the one of the at least one second electronic control unit.

* * * * *